(12) United States Patent
Itoh et al.

(10) Patent No.: US 10,518,975 B2
(45) Date of Patent: Dec. 31, 2019

(54) CONVEYING DEVICE

(71) Applicant: ITOH DENKI CO., LTD., Kasai-shi, Hyogo (JP)

(72) Inventors: Kazuo Itoh, Kasai (JP); Toshiyuki Tachibana, Himeji (JP); Yoshiyuki Kujihashi, Kato (JP); Masayuki Shimoda, Himeji (JP)

(73) Assignee: Itoh Denki Co., Ltd. (JP)

( * ) Notice: Subject to any disclaimer, the term of this patent is extended or adjusted under 35 U.S.C. 154(b) by 0 days.

(21) Appl. No.: 16/097,865

(22) PCT Filed: May 17, 2017

(86) PCT No.: PCT/JP2017/018584
§ 371 (c)(1),
(2) Date: Oct. 31, 2018

(87) PCT Pub. No.: WO2017/200019
PCT Pub. Date: Nov. 23, 2017

(65) Prior Publication Data
US 2019/0135542 A1     May 9, 2019

(30) Foreign Application Priority Data

May 19, 2016 (JP) .................................. 2016-100768

(51) Int. Cl.
*B65G 47/46* (2006.01)
*B65G 47/54* (2006.01)
(Continued)

(52) U.S. Cl.
CPC ............. *B65G 13/10* (2013.01); *B65G 47/46* (2013.01); *B65G 47/54* (2013.01); *B65G 47/64* (2013.01)

(58) Field of Classification Search
CPC ........ B65G 47/54; B65G 47/24; B65G 47/28; B65G 13/02; B65G 13/04; B65G 2207/34;
(Continued)

(56) References Cited

U.S. PATENT DOCUMENTS 6,694,220 B1 * 2/2004 Tanz .................... B65G 1/0478
198/369.4
8,567,587 B2 * 10/2013 Faist .................... B65G 1/0478
198/370.09

(Continued)

FOREIGN PATENT DOCUMENTS

JP       06-298321 A    10/1994
JP    2004-075387 A     3/2004
(Continued)

OTHER PUBLICATIONS

International Preliminary Report on Patentability and Written Opinion, dated Nov. 20, 2018 in International Application No. PCT/JP2017/018584.
(Continued)

*Primary Examiner* — James R Bidwell
(74) *Attorney, Agent, or Firm* — Wood, Phillips, Katz, Clark & Mortimer

(57) ABSTRACT

An object of the present invention is to develop a conveying device capable of carrying out an object in multiple directions. The conveying device includes a plurality of conveying cells 1 that move the object, and the plurality of conveying cells 1 are arranged in plane. The conveying cell 1 includes a conveying direction changing unit that changes a conveying direction and a controller. An address is given to the conveying cell 1, and based on a conveying destination of the object carried in the conveying cell 1 and an own address of the conveying cell 1, the controller determines a
(Continued)

carrying-out direction of the conveying cell 1 such that the object approaches the conveying destination.

12 Claims, 13 Drawing Sheets

(51) Int. Cl.
  *B65G 47/64* (2006.01)
  *B65G 13/10* (2006.01)
(58) Field of Classification Search
  CPC ...... B65G 39/025; B65G 13/10; B65G 47/46; B65G 47/64
  USPC ................................ 198/370.09; 193/35 MD
  See application file for complete search history.

(56) References Cited

U.S. PATENT DOCUMENTS

| | | | | |
|---|---|---|---|---|
| 8,978,879 | B2* | 3/2015 | Fourney | B65G 39/04 198/782 |
| 9,950,344 | B2* | 4/2018 | Hartmann | B07C 3/006 |
| 2003/0234155 | A1 | 12/2003 | Kanamori et al. | |
| 2008/0169171 | A1 | 7/2008 | Itoh et al. | |
| 2011/0022221 | A1 | 1/2011 | Fourney | |
| 2014/0116841 | A1 | 5/2014 | Wilkins | |
| 2015/0107961 | A1* | 4/2015 | Guo | B65G 39/025 198/464.1 |

FOREIGN PATENT DOCUMENTS

| | | |
|---|---|---|
| JP | 2008-174318 A | 7/2008 |
| JP | 2012-051680 A | 3/2012 |
| JP | 2013-500220 A | 1/2013 |
| JP | 2013-095585 A | 5/2013 |
| JP | 2015-163549 A | 2/2015 |
| JP | 2015-163547 A | 9/2015 |
| WO | 2011/011195 A1 | 1/2011 |

OTHER PUBLICATIONS

International Search Report, dated Aug. 8, 2017 in International Application No. PCT/JP2017/018584.

* cited by examiner

FIG. 4
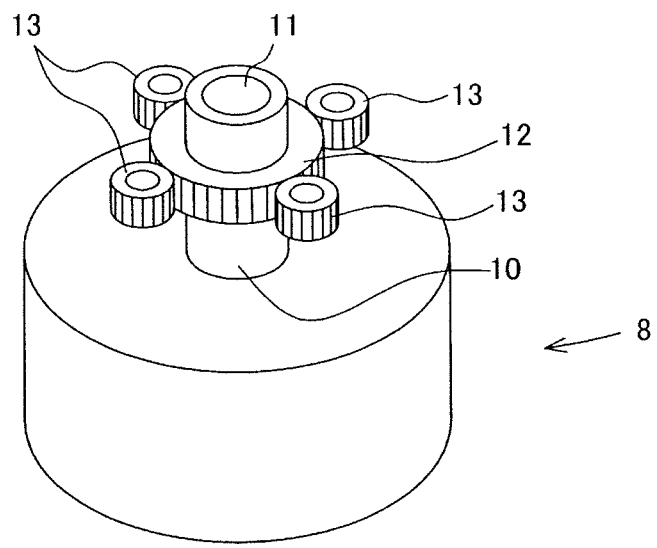
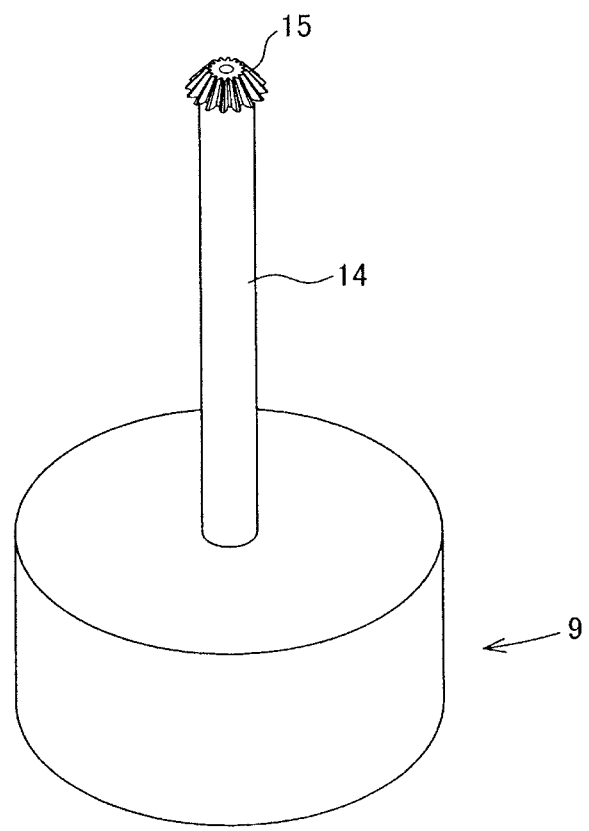

CONVEYING DEVICE

TECHNICAL FIELD

The present invention relates to a conveying device that conveys an object, more particularly to a conveying device that carries out the object in a plurality of directions and carries in the object from a plurality of directions.

BACKGROUND ART

Many types of objects are handled in a delivery place, a collection place, a warehouse, or the like. In some cases, a large number of objects are sorted, and loaded on a truck or carried to a specific shelf.

Conventionally, the objects are sorted by a sorting system in which a plurality of transfer devices of Patent Documents 1, 2, and 3 are installed.

The transfer devices described in Patent Documents 1 and 2 have a main conveying passage through which the object passes linearly and a sub conveying passage through which the object is carried out in an orthogonal direction, and the object can be transferred to another conveyor line.

The transfer device described in Patent Document 3 has a main conveying passage through which the object passes linearly and a discharge unit that discharges the object in an oblique direction, and the object can obliquely be carried out and transferred to another conveyor line.

The conventional sorting system is a system in which many transfer devices are arranged such that the conveyor lines are branched in a complex manner. The objects are conveyed by the sorting system, delivered to the branching conveyor line branched from the original conveyor line to gradually narrow down the conveying destination, and moved to an intended conveying destination.

PRIOR ART DOCUMENTS

Patent Documents

Patent Document 1: JP 2015-163549 A
Patent Document 2: JP 2012-51680 A
Patent Document 3: JP 2015-163547 A

DISCLOSURE OF INVENTION

Technical Problem

The conventional transfer device selectively carries out the introduced object in two directions.

As a result, the conventional sorting system becomes a complicated branching conveyor line and a considerably large scale. That is, a large installation place is required in order to construct the conventional sorting system.

The present invention has focused on the above problem, and an object thereof is to develop a conveying device capable of carrying out the object in multiple directions.

Solution to Problem

According to one aspect of the present invention, a conveying device including a plurality of conveying cells that move an object, the plurality of conveying cells being arranged planarly, wherein some of the plurality of conveying cells include a conveying direction changing unit that changes a conveying direction, wherein each of the plurality of conveying cells is configured to be driven by a corresponding controller, wherein each of the plurality of conveying cells has an address, wherein the plurality of conveying cells include a subject conveying cell, and wherein based on an address of the subject conveying cell and a conveying destination of the object that has been carried in the subject conveying cell, the controller determines a carrying-out direction of the subject conveying cell such that the object approaches the conveying destination.

The conveying device of the present invention is a conveying device in which the plurality of conveying cells are arranged in plane. The conveying cell includes the plurality of cells with the direction changing function, the plurality of cells with the direction changing function including the conveying direction changing unit that changes the conveying direction.

In the conveying device of the present invention, the address is given to the conveying cell. Based on the conveying destination of the object carried in the conveying cell and the own address, the controller determines the carrying-out direction such that the object approaches the conveying destination, and causes the conveying direction changing unit to function to change the advancing direction of the object. Consequently, the object can be carried out from the desired position of the conveying device to the outside.

Preferably, each of the conveying cells includes the controller.

In the above-mentioned aspects, preferably, the plurality of conveying cells include an adjacent conveying cell disposed adjacently to the subject conveying cell, delivery of the object between the subject conveying cell and the adjacent conveying cell can be recognized, and information representing the conveying destination of the object is delivered along with movement of the object.

In the conveying device of this aspect, the information about the conveying destination of the object is delivered along with the movement of the object. For this reason, a control device having comparatively low capability is sufficient to collectively control the conveying device. Because the controller corresponding to individual conveying cell performs communication and calculation of a signal, a calculation speed is fast, a response speed of the conveying cell is fast, and a conveying speed of the object is fast.

In the above-mentioned aspects, preferably, there is provided the conveying device, wherein the controller includes: a conveying destination storage that stores destination information temporarily, the destination information representing the conveying destination of the object; an information receiving unit that receives the destination information sent by the controller, the controller handling the conveying cell that has carried in the object; and an information transmission unit that transmits the destination information to the controller, the controller handling the conveying cell that receives the object.

In the conveying device of this aspect, the controller corresponding to each conveying cell includes the conveying destination storage, the information receiving unit, and the information transmission unit. In the conveying device of this aspect, as the object is moved across the conveying cells, the conveying destination information is transferred from the conveying cell on the upstream side to the conveying cell on the downstream side. When the object reaches the conveying cell in which the advancing direction of the object is to be changed, the conveying destination information is also transmitted to the conveying cell. Consequently, the conveying cell operates based on the transmitted information about the conveying destination, and the object can be sent in a desired direction.

In the above-mentioned aspects, preferably, the plurality of conveying cells each include one or more load presence sensors, each of the load presence sensors detecting whether the object is present on the conveying cell.

In the above-mentioned aspects, preferably, the conveying device further includes a conveying destination selector that specifies the conveying destination, wherein information representing the conveying destination of the object is input to the controller handling a certain conveying cell.

In the above-mentioned aspects, preferably, the conveying cells are arranged in columns and rows, accordingly the address given to the conveying cell including a column address associated with a position in the column and a row address associated with a position in the row, the conveying destination includes the column address associated with a position in the column and the row address associated with a position in the row, along with movement of the object in a column direction or a row direction by the conveying cell, the column address or the row address of the conveying destination of the object is compared to the column address or the row address of the conveying cell, and the conveying cell changes the conveying direction to move the object in the row direction when the conveying cell moves the object in the column direction and matches the column addresses with each other, whereas the conveying cell changes the conveying direction to move the object in the column direction when the conveying cell moves the object in the row direction and matches the row addresses with each other.

Specifically, preferably, the object moves in the column direction or the row direction by the conveying cell, the column address or the row address of the conveying destination of the object is compared to the column address or the row address of the conveying cell, the conveying cell changes the conveying direction to move the object in the row direction when the conveying cell moves the object in the column direction to match the column addresses with each other, and the conveying cell changes the conveying direction to move the object in the column direction when the conveying cell moves the object in the row direction to match the row addresses with each other.

Preferably, the plurality of conveying cells include an adjacent conveying cell disposed adjacently to the subject conveying cell, delivery of the object between the subject conveying cell and the adjacent conveying cell can be recognized, the controller includes a conveying destination storage that temporarily stores destination information representing the conveying destination of the object, and the destination information is erased when the delivery of the object from the subject conveying cell to the adjacent conveying cell is recognized, the destination information having been stored in the conveying destination storage for the subject conveying cell.

Preferably, the plurality of conveying cells include an adjacent conveying cell disposed adjacently to the subject conveying cell, delivery of the object between the subject conveying cell and the adjacent conveying cell can be recognized, the controller includes a conveying destination storage that temporarily stores destination information representing the conveying destination of the object, and the destination information is rewritten to a new destination information when the delivery of the object from the adjacently conveying cell to the subject conveying cell is recognized, the new destination information going to be stored in the conveying destination storage for the subject conveying cell.

Preferably, the conveying cell includes: a traveling unit that moves a object, the traveling unit including a contact member that rotates or travels in contact with the object; a turning table that supports the traveling unit; a turning motor; and a traveling motor, the traveling unit is driven by the traveling motor, and the turning table is directly or indirectly engaged with an output unit of the turning motor such that the turning table and the traveling unit are turned by the turning motor.

Preferably, the conveying cell includes: a traveling unit that moves a object, the traveling unit including a contact member that rotates or travels in contact with the object; a turning table that supports the traveling unit; a turning motor; a traveling motor; and a driving shaft, the turning motor includes a through-hole penetrating in an axial direction and an output unit that outputs turning force, the driving shaft is inserted in the through-hole, the traveling motor is provided below the turning motor, the driving shaft is rotated by the traveling motor, the traveling unit is driven by the driving shaft, and the turning table is directly or indirectly engaged with the output unit of the turning motor such that the turning table and the traveling unit are turned by the turning motor.

Preferably, the turning motor and the traveling motor are located at overlapping positions Preferably, the conveying cell includes a main conveying conveyor, a sub conveying conveyor, and an lifting and lowering unit that lifts and lowers at least one of the main conveying conveyor and the sub conveying conveyor, the main conveying conveyor includes a main conveying passage through which the object is conveyed in a certain direction in a certain planar area, the sub conveying conveyor includes a sub conveying passage through which the object is conveyed in a direction intersecting with the conveying direction of the main conveying passage, the sub conveying passage being disposed in a planar area identical to that of the main conveying passage, and the conveying direction of the object is changed by lifting one of the main conveying passage and the sub conveying passage above the other using the lifting and lowering unit.

Effect of Invention

The conveying device of the present invention can carry out the object in multiple directions. Consequently, according to the conveying device of the present invention, the sorting system can be constructed in a narrow space.

BRIEF DESCRIPTION OF DRAWINGS

FIG. 4 is a perspective view in which a turning motor and a traveling motor of the conveying cell in FIG. 2 are disassembled.

BEST MODE FOR CARRYING OUT THE INVENTION

Hereinafter, an embodiment of the present invention will be described.

Figure 1:
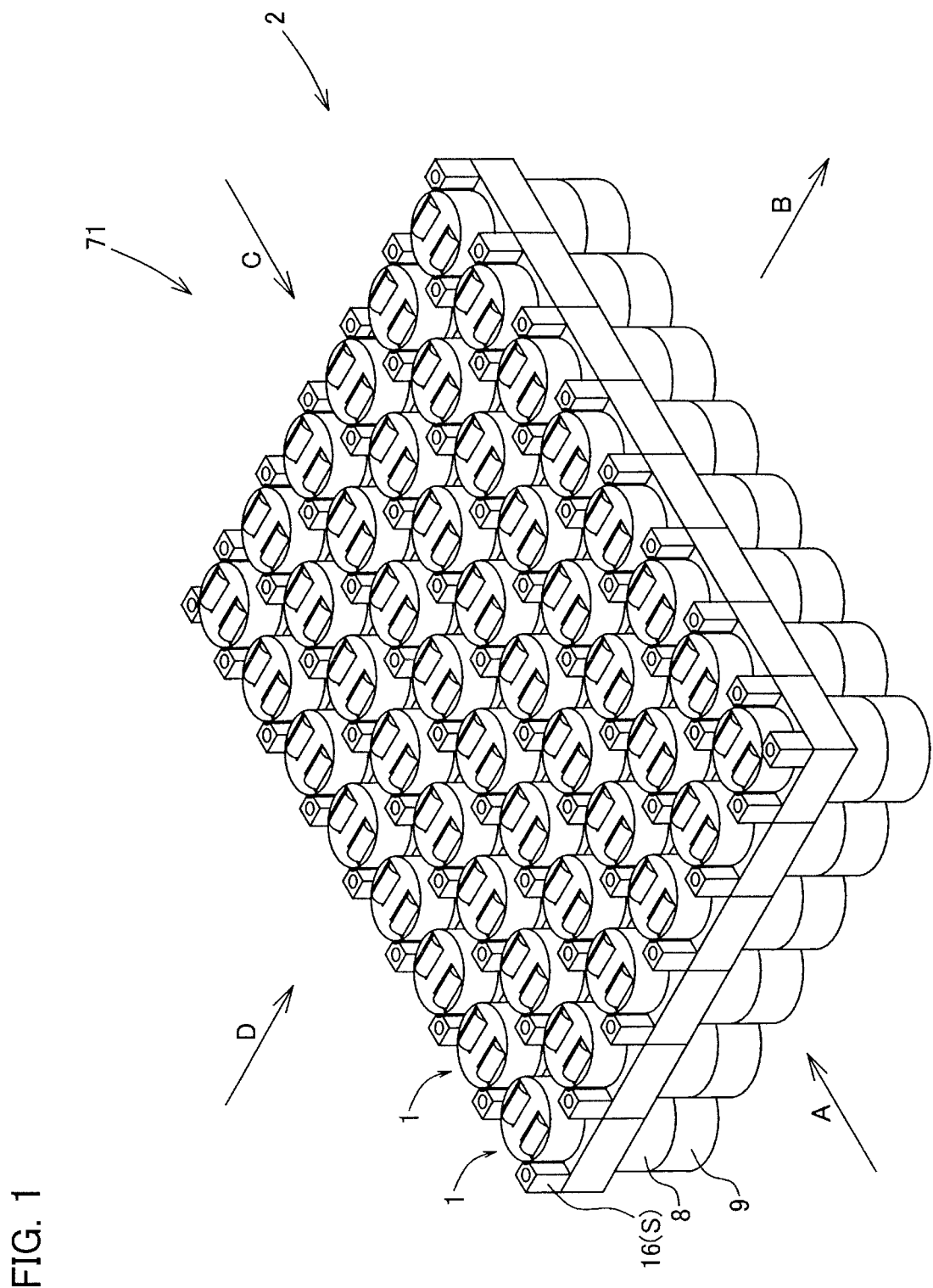
FIG. 1 is a perspective view illustrating a conveying device according to an embodiment of the present invention.

FIG. 1 illustrates a conveying device 2 according to an embodiment of the present invention. As illustrated in FIG. 1, the conveying device 2 includes a large number of conveying cells 1 arranged planarly. That is, the large number of conveying cells 1 are laid planarly to constitute a conveying device 2. In the present embodiment, 48 conveying cells 1 are arranged in a rectangular shape in planar view. More specifically, in the conveying device 2, the conveying cells 1 are arranged in a matrix of six columns by eight rows.

Figure 2:
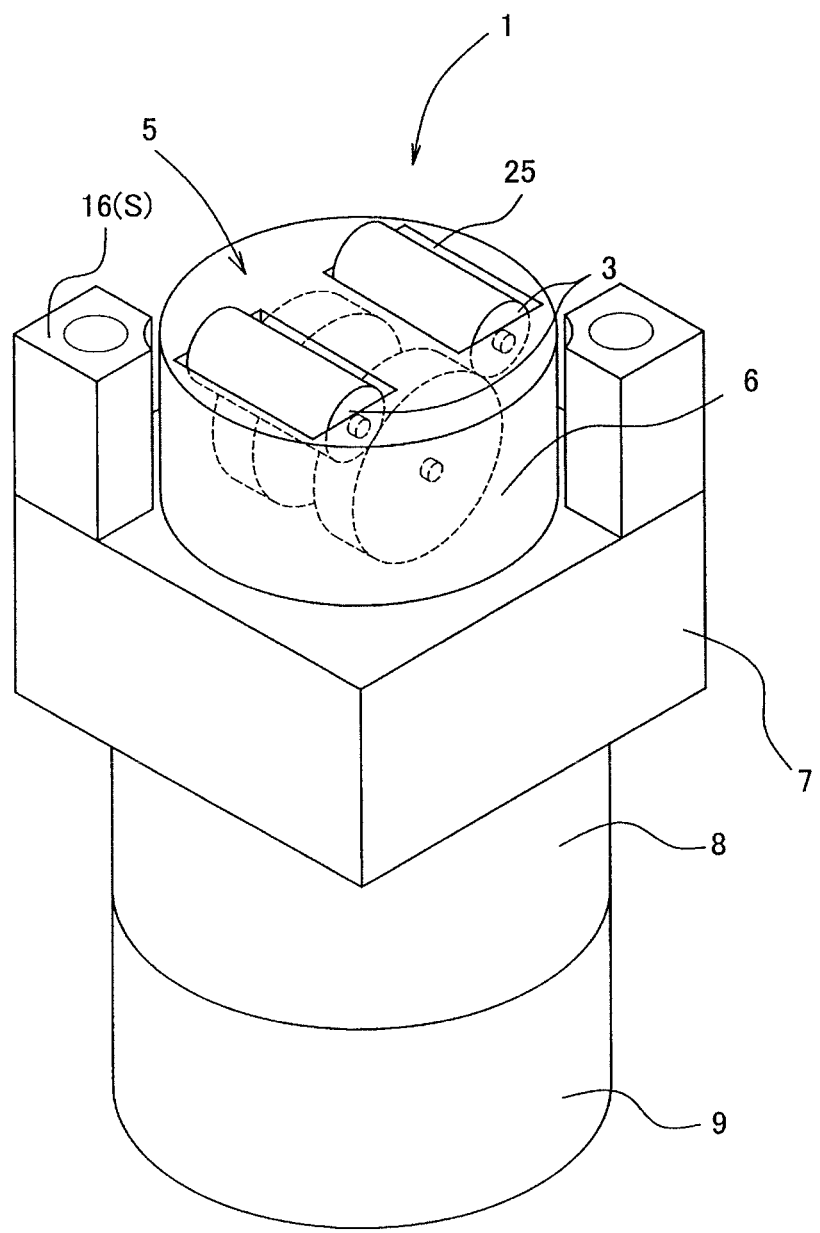
FIG. 2 is a perspective view illustrating a conveying cell constituting the conveying device in FIG. 1.

FIG. 2 illustrates an appearance of the conveying cell 1.

The conveying cell 1 has a function of moving the object by using a conveying roller 3. Alternatively, the conveying cell 1 may include a conveying direction changing unit that changes a conveying direction. Specifically, the conveying cell 1 includes a turning table 6 that can change the direction of the conveying roller 3 and change a moving direction of the object.

Figure 3:
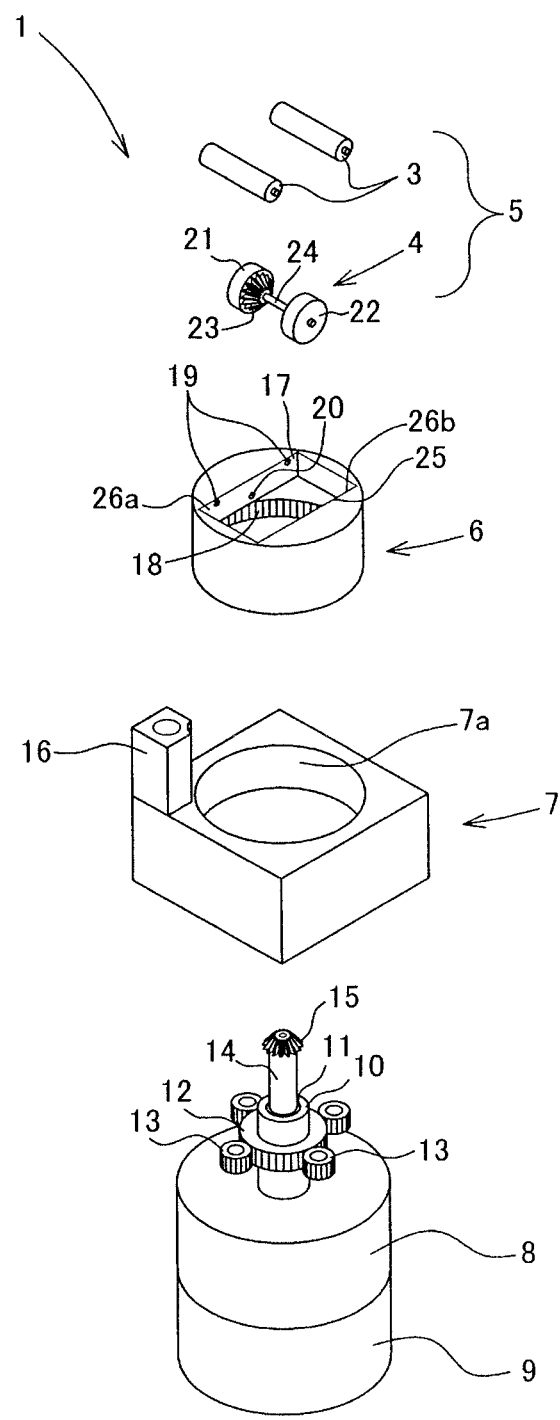
FIG. 3 is an exploded perspective view of the conveying cell in FIG. 2.

A structure of the conveying cell 1 will be described below. As illustrated in FIGS. 2 and 3, the conveying cell 1 includes a traveling unit 5, the turning table 6, a casing 7, a turning motor 8, and a traveling motor 9 in order from the top.

The casing 7 is fixed to a fixing structure (not illustrated) of the conveying device 2.

The turning motor 8 is fixed to the casing 7. The traveling motor 9 is fixed under the turning motor 8.

The traveling unit 5 is mounted on the turning table 6.

The turning table 6 is rotatably mounted on the turning motor 8.

The traveling unit 5 is engaged with the traveling motor 9.

Each of these configurations will be described, and then operation of the conveying cell 1 will be described.

As illustrated in FIG. 3, the traveling unit 5 includes two conveying rollers 3 (rotating bodies) and a driving roller 4 (driving body).

The two conveying rollers 3 are rotatably supported by the turning table 6 (to be described later). The shaft cores of the two conveying rollers 3 are parallel to each other. The two conveying rollers 3 are disposed at a predetermined interval, and a conveying surface on which the object is placed (comes into contact) is formed by the surface of the conveying roller 3.

The driving roller 4 is disposed near a center on a lower side of the two conveying rollers 3.

Figure 5:
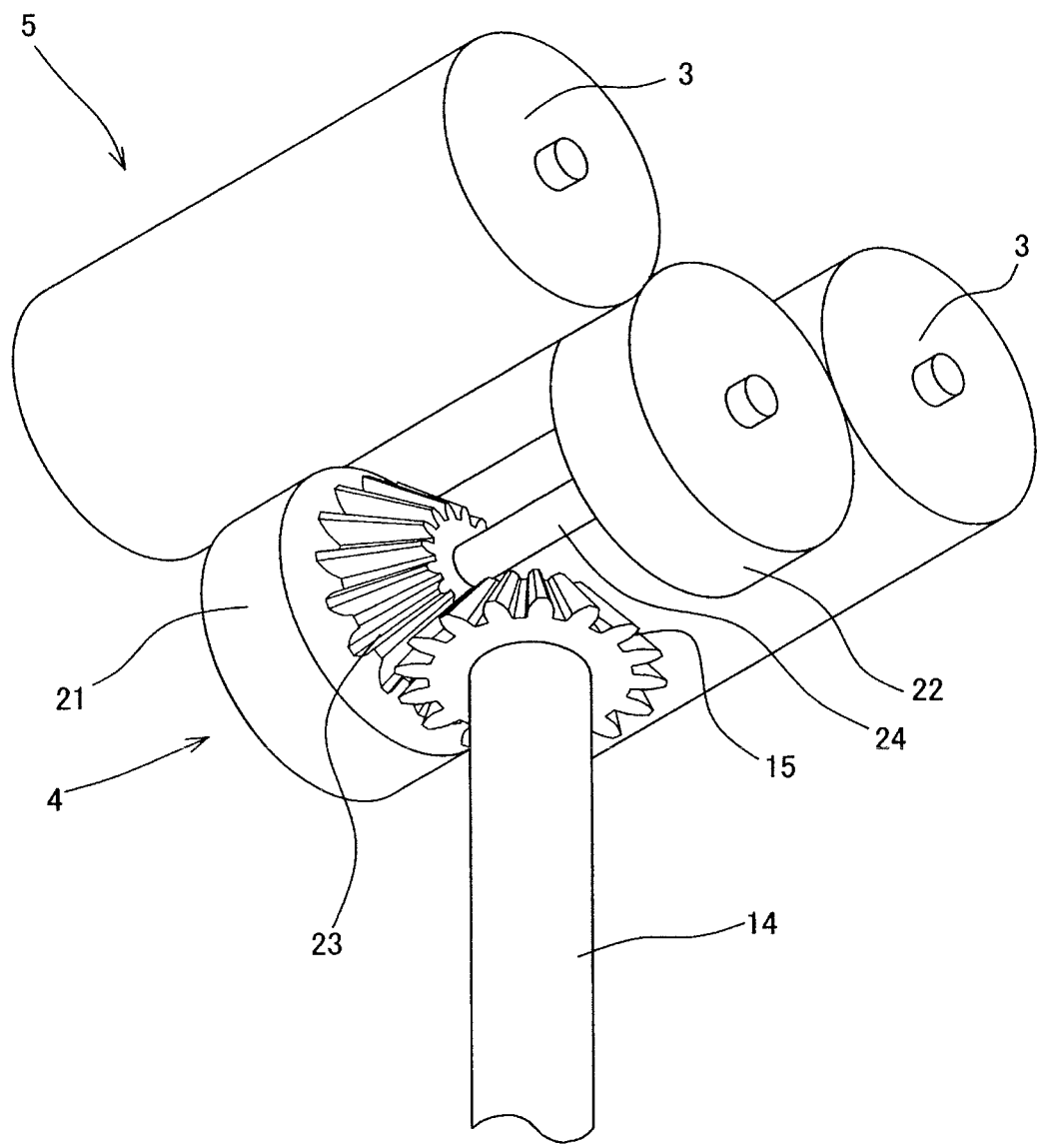
FIG. 5 is a partial perspective view illustrating a roller driving portion of the conveying cell in FIG. 2 when the roller driving portion is viewed from obliquely below.

As illustrated in FIGS. 3 and 5, the driving roller 4 includes pressing units 21, 22, a bevel gear 23, and a shaft 24.

The pressing units 21, 22 have a columnar shape including a circumferential surface.

The pressing units 21, 22 are disposed at a predetermined interval.

A bevel gear 23 is provided at a portion of the pressing unit 21 opposed to the pressing unit 22. The pressing unit 21 and the bevel gear 23 are integral with each other, and are coupled to the pressing unit 22 with the shaft 24 interposed therebetween. Both ends of the shaft 24 protrude to outsides of the pressing units 21, 22. The pressing unit 21, the bevel gear 23, the pressing unit 22, and the shaft 24 are integrally fixed and rotated.

Both the ends of the shaft 24 of the driving roller 4 are rotatably supported by the turning table 6 (to be described later).

As illustrated in FIG. 5, circumferential portions of the pressing units 21, 22 of the driving roller 4 press the conveying roller 3. The two conveying rollers 3 rotate when the driving roller 4 rotates.

As illustrated in FIG. 3, the turning table 6 is a tubular member including a circumferential surface. A fixing unit 17 and an engagement unit 18 are provided in the turning table 6. The fixing unit 17 and the engagement unit 18 are vertically disposed, and the fixing unit 17 is disposed above the engagement unit 18. A quadrangular opening 25 is formed on a top surface of the turning table 6.

The fixing unit 17 includes a pair of opposed wall surfaces 26a, 26b continuous with the opening 25.

A driving roller fixing unit 20 and two roller fixing units 19 are provided on the wall surface 26a. The driving roller fixing unit 20 and the two roller fixing units 19 are constructed with known bearings.

The two roller fixing units 19 are provided at a predetermined interval. The driving roller fixing unit 20 is provided around a middle of the two roller fixing units 19. The driving roller fixing unit 20 is provided below the roller fixing unit 19.

Although not illustrated for convenience, the driving roller fixing unit 20 and the two roller fixing units 19 are also provided on the wall surface 26b similar to the driving roller fixing unit 20 and the two roller fixing units 19 provided on the wall surface 26a.

A shaft of the conveying roller 3 of the traveling unit 5 is rotatably mounted on each roller fixing unit 19 of the wall surfaces 26a, 26b. The driving roller 4 (shaft 24) is rotatably mounted on each driving roller fixing unit 20 of the wall surfaces 26a, 26b. In this way; each conveying roller 3 and each driving roller 4 of the traveling unit 5 are rotatably supported by the fixing unit 17.

When each conveying roller 3 is mounted on the fixing unit 17 of the turning table 6, a part of each conveying roller 3 is exposed to the outside from the opening 25 as illustrated in FIGS. 1 and 2. That is, a part of the upper portion of each conveying roller 3 is exposed to the outside from the opening 25, and the other portions are accommodated in the turning table 6.

As illustrated in FIG. 3, the engagement unit 18 below the fixing unit 17 constitutes annularly continuous internal teeth.

As illustrated in FIG. 3, the casing 7 has a quadrangular prism outer shape. A turning motor disposition hole 7a penetrating vertically is made in the casing 7. A turning motor 8 (to be described later) is accommodated and disposed in the turning motor disposition hole 7a.

A load presence sensor 16 is provided on the top surface of the casing 7. The load presence sensor 16 has a function of detecting presence or passage of the product. A height position of an upper end of the load presence sensor 16 is slightly lower than the upper portion (conveying surface) of the conveying roller 3. Although FIG. 2 illustrates only one load presence sensors 16, the load presence sensors 16 are preferably provided at four points around the turning motor disposition hole 7a. That is, at least two load presence sensors 16 may be provided in the conveying cell 1. The load presence sensors 16 are preferably provided in all the conveying cells 1, but some of the conveying cells 1 may not include the load presence sensor 16.

The casing 7 is fixed to a fixing structure (not illustrated). As a result of fixing the casing 7 to the fixing structure, an attitude of the conveying cell 1 is stabilized.

The turning motor 8 (FIG. 4) includes a stator 72 and a rotor 27 (FIG. 6) similarly to a known motor; and an output shaft 10 is connected to the rotor 27. The rotor 27 of the turning motor 8 has a cylindrical shape as illustrated in FIG. 6, and a through-hole 73 is formed in the rotor 27.

A through-hole 11 is also provided in the output shaft 10. The through-hole 73 provided in the rotor 27 and the through-hole 11 provided in the output shaft 10 communicate with each other. Thus, the turning motor 8 includes the through-hole 11 penetrating in an axial direction.

An output gear 12 is integrally fixed to the outside of the output shaft 10. That is, the output gear 12 rotates integrally with the output shaft 10. A plurality of (for example, four) small gears 13 are arranged at equal intervals around the output gear 12. The shaft of each small gear 13 is rotatably supported by a coupling member (not illustrated). The coupling member is fixed to the casing 7 by a fixing member (not illustrated), and the small gear 13 does not revolve.

Figure 6:
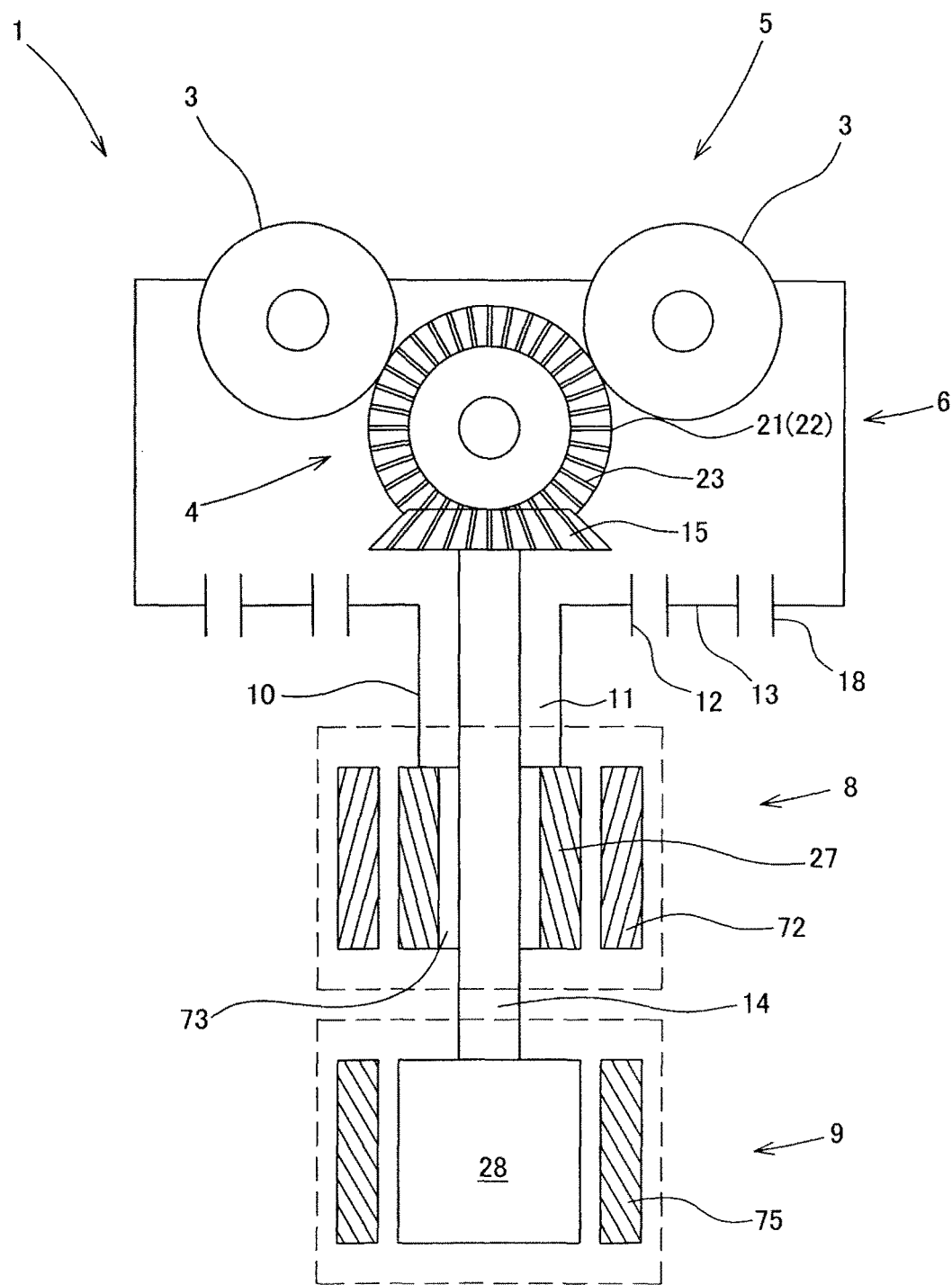
FIG. 6 is a skeleton diagram illustrating a power system of the conveying cell in FIG. 2.

As illustrated in FIG. 6, each small gear 13 is engaged with the engagement unit 18 (internal teeth) of the turning table 6 illustrated in FIG. 2. Power of the turning motor 8 is transmitted to the engagement unit 18 on the side of the turning table 6 through the output shaft 10, the output gear 12, and the plurality of small gears 13.

The small gear 13 may be omitted. That is, the output gear 12 and the engagement unit 18 of the turning table 6 may directly be engaged with each other.

As illustrated in FIG. 6, the traveling motor 9 has a stator 75 and a rotor 28 similarly to a known motor. A driving shaft 14 that is an output shaft is connected to the rotor 28. A bevel gear 15 is provided at a leading end of the driving shaft 14, and the bevel gear 15 rotates integrally with the driving shaft 14. An outer diameter of the driving shaft 14 is smaller than inner diameters of the through-hole 11 of the output shaft 10 of the turning motor 8 and the through-hole 73 of the stator 72. As illustrated in FIG. 6, the driving shaft 14 of the traveling motor 9 penetrates the through-holes 73, 11 of the turning motor 8. The driving shaft 14 of the traveling motor 9 and the output shaft 10 of the turning motor 8 are concentric.

The bevel gear 15 is engaged with the bevel gear 23 of the driving roller 4 of the traveling unit 5. The power of the rotor 28 of the traveling motor 9 is transmitted to the bevel gear 23 on the side of the traveling unit 5 through the driving shaft 14 and the bevel gear 15.

Figure 7:
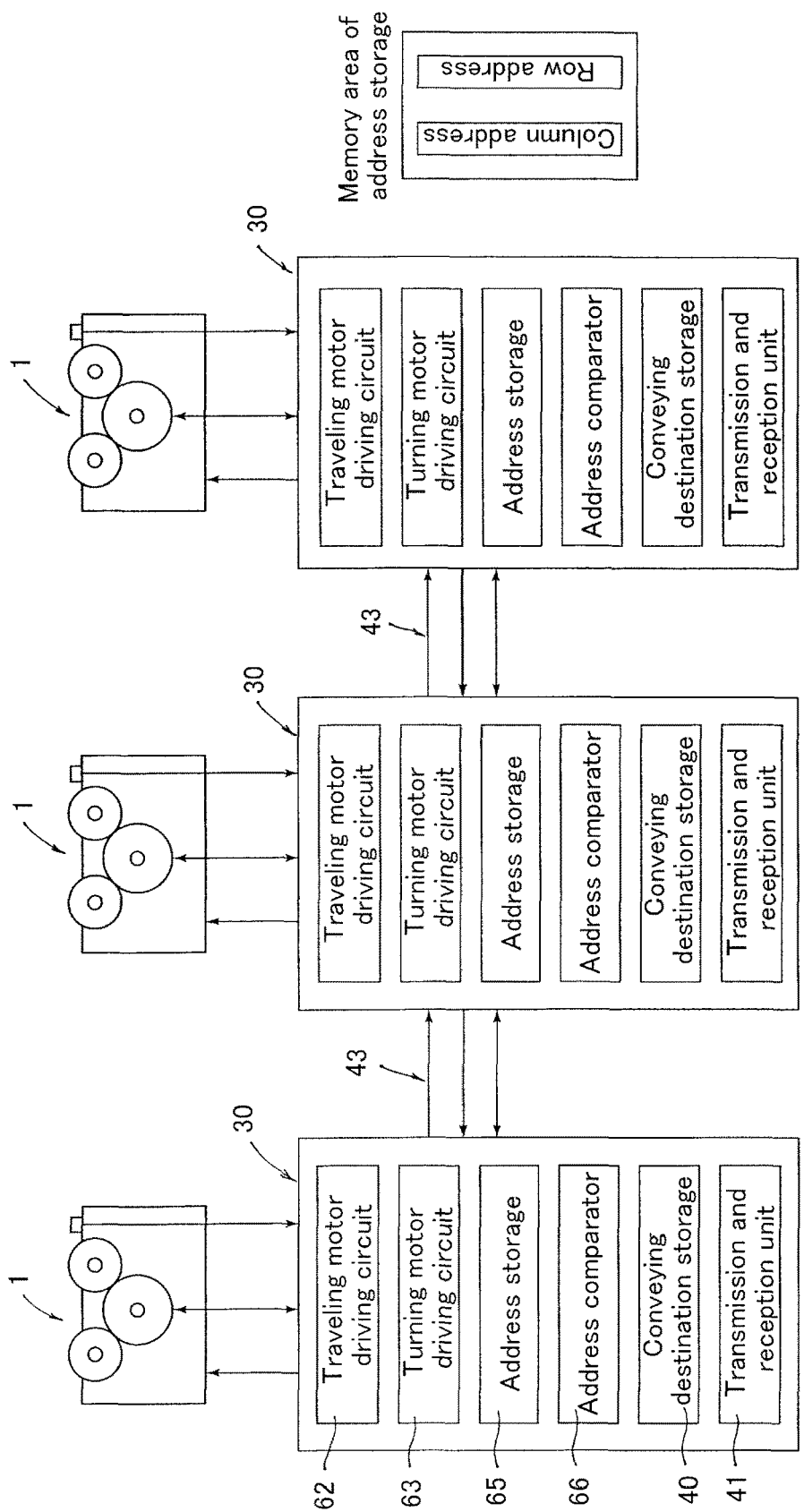
FIG. 7A is a block diagram illustrating a control device handling each conveying cell of the conveying device in FIG. 1 and is a circuit diagram illustrating a relationship between adjacent control devices.
FIG. 7B is a view illustrating a memory area of an address storage.

A control device 30 in FIG. 7 is incorporated in the conveying cell 1. The control device 30 supplies electric power to the traveling motor 9 and the turning motor 8 of each conveying cell 1, and drives and stops the traveling motor 9 and the turning motor 8 of each conveying cell 1. That is, as illustrated in FIG. 7, a traveling motor driving circuit 62 that drives the traveling motor 9 and a turning motor driving circuit 63 that drives the turning motor 8 are incorporated in the control device 30.

An address storage 65, an address comparator 66 and a conveying destination storage 40 are incorporated in the control device 30. The address storage 65, the address comparator 66 and the conveying destination storage 40 are implemented by a CPU, a memory, and software stored in the memory.

A transmission and reception unit 41 is incorporated in the control device 30.

The address storage 65 is a memory as described above, and an address indicating a position of each conveying cell 1 is stored in the address storage 65.

As described above, the conveying cells 1 are arranged in a matrix of six columns by eight rows, and the address is a node number of the conveying cell 1. The address is constructed with a column address indicating the position in the column and a row address indicating the position in the row. For convenience, a memory area on the left side of the address storage in FIG. 7 is set to an area where the column address is stored, and a memory area on the right side is set to an area where the row address is stored.

Figure 9:
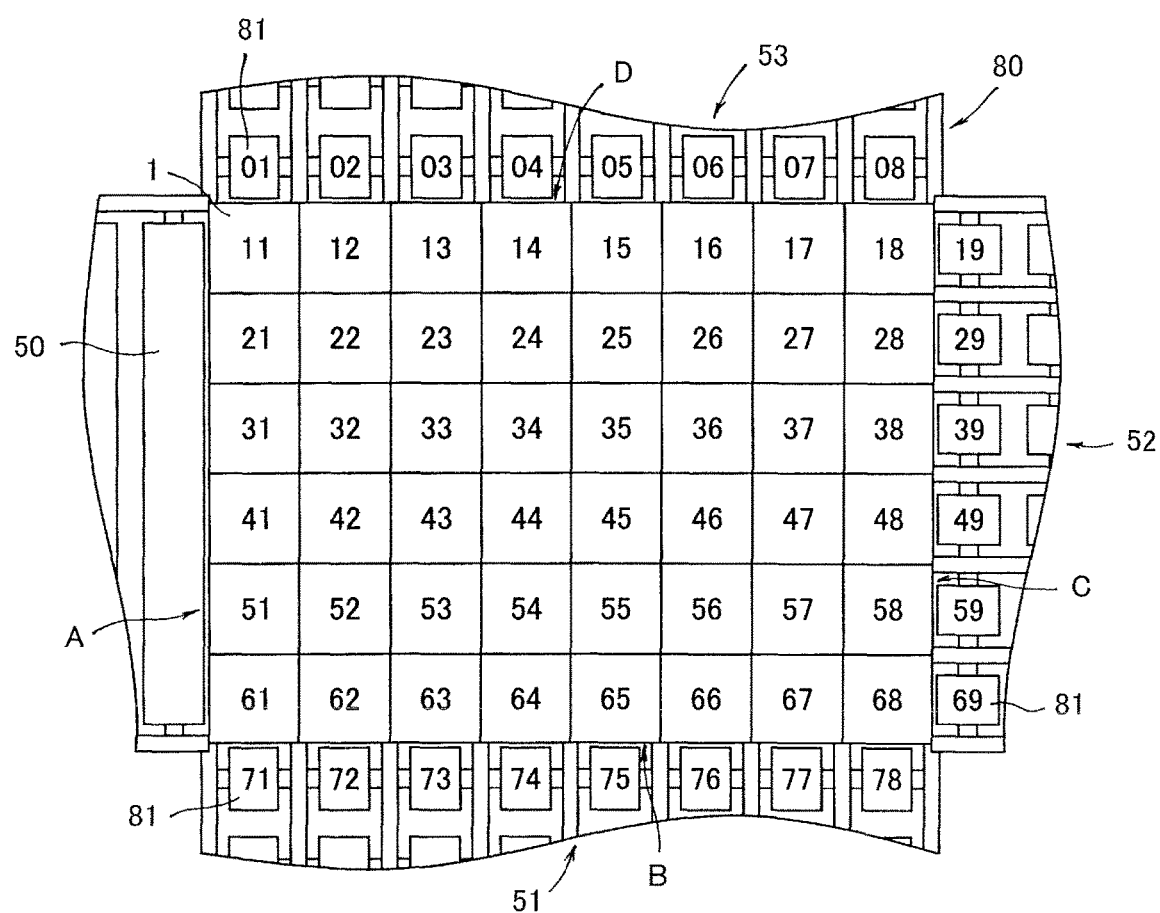
FIG. 9 is a conceptual view illustrating a sorting system including the conveying device in FIG. 1.

FIG. 9 illustrates the address of each conveying cell 1 of the conveying device 2.

The address corresponding to the position of each conveying cell 1 of the conveying device 2 in FIG. 9 is stored in the address storage 65.

The conveying destination storage 40 is a memory in which conveying destination information (destination information) is temporarily stored.

As used herein, the conveying destination information is information indicating a conveying destination where an object 55 is carried out from the conveying device 2. In the present embodiment, as described later, a carrying-in conveyor 50 is provided in one side A of the conveying device 2, and carrying-out conveyor groups 51, 52, 53 are provided in remaining three sides B, C, D.

A sequentially numbered address is given to each branch conveyor constituting the same carrying-out conveyor group 51, 52, 53.

The transmission and reception unit 41 exchanges a signal with the control device 30 of the adjacent conveying cell, and has a function as information receiving unit that receives the conveying destination information from the conveying cell on an upstream side and a function as a an information transmission unit that transmits the conveying destination information to the conveying cell on a downstream side.

The address comparator 66 compares the conveying destination information received from the conveying cell 1 on the upstream side by the transmission and reception unit 41 to an own address (an address of a subject conveying cell) stored in own address storage 65 (address storage 65 related to the subject conveying cell) to determine the conveying direction. In the present embodiment, the column address and the row address of the conveying destination of the object are compared to the column address and the row address of the conveying cell 1, and the conveying cell 1 changes the conveying direction to move the object 55 in the row direction or the column direction when the row addresses or the column addresses of the both are matched with each other.

For example, the object is linearly moved in the row direction, and in the process, the column address of the conveying destination of the object is compared to the column address of the conveying cell 1 at the conveying cell 1 where the object is placed. When the column address of the conveying destination of the object is matched with the column address of the conveying cell 1, the conveying cell 1 changes the conveying direction to move the object 55 in the row direction.

Similarly, when the object is linearly moved in the row direction, in the process, the row address of the conveying destination of the object is compared to the row address of the conveying cell 1 at the conveying cell 1 where the object is placed. When the row address of the conveying destination of the object is matched with the row address of the conveying cell 1, the conveying cell 1 changes the conveying direction to move the object 55 in the column direction.

In the present embodiment, the control device 30 is provided in all the conveying cells 1, and the adjacent control devices 30 are mutually connected by a signal line 43. The signal of the load presence sensor 16 of each conveying cell 1 is input to each control device 30.

Figure 8:
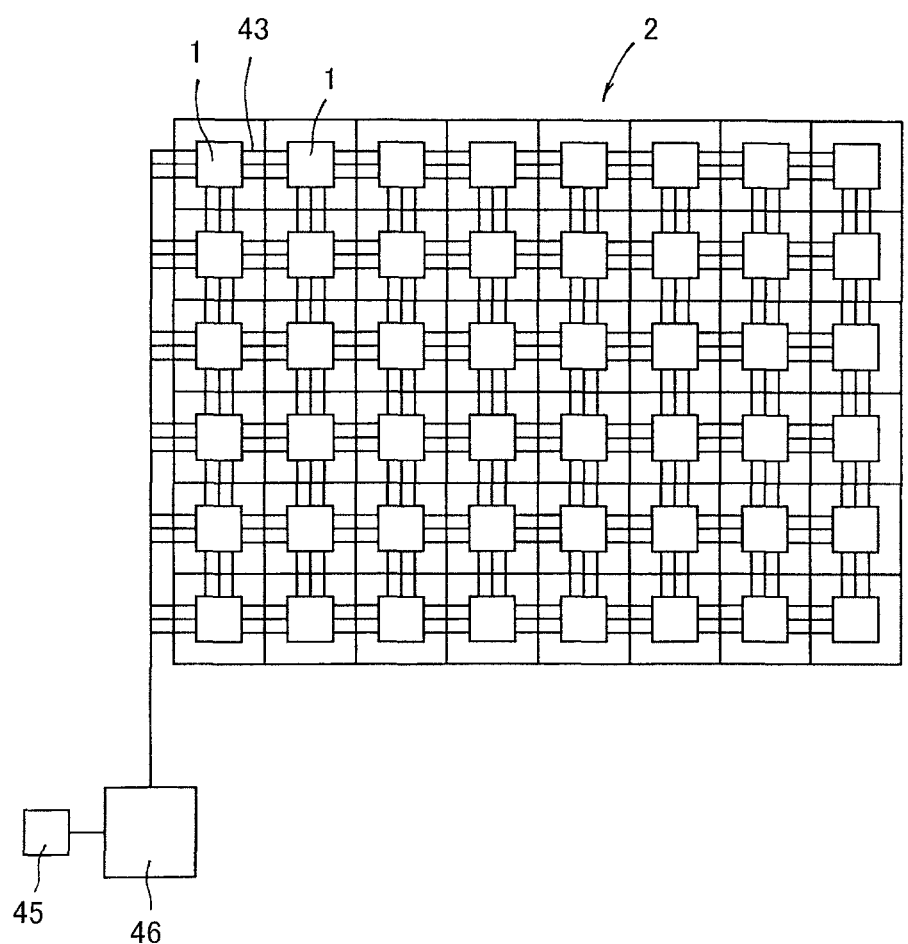
FIG. 8 is a conceptual view illustrating association of the control device handling each conveying cell of the conveying device in FIG. 1.

Because the conveying cells 1 are vertically and horizontally arranged, the conveying cells 1 adjacent in the longitudinal direction and the conveying cells 1 adjacent in the lateral direction are mutually connected by the signal line 43 as illustrated in FIG. 8.

As illustrated in FIG. 8, a host control device 46 is connected to the conveying cell 1 facing the most carrying-in side A.

A sorting system 80 which adopts the conveying device 2 will be described below.

In the conveying device 2 of the present embodiment, the load presence sensor 16 is provided in each conveying cell 1. In the conveying device 2 of the present embodiment, when the plurality of conveying cells 1 are laid in a planar manner and assembled in a planar conveying device 71, a boundary sensor that checks introduction or discharge of the product into or from the planar conveying device 71 is provided in each side of the planar conveying device 71. The boundary sensor is also one of the load presence sensors.

In the conveying device 2, as described above, the 48 conveying cells 1 are arranged in the rectangular shape in planar view, and one side A of the conveying cell 1 functions as the carrying-in side, and the other three sides B, C, D function as the carrying-out side.

The conveying device 2 constitutes the sorting system 80, and a carrying-in conveyor 50 is connected to the carrying-in side A as illustrated in FIG. 9. The carrying-out conveyor groups 51, 52, and 53 are connected to the carrying-out sides B, C, D, respectively.

Each of the carrying-out conveyor groups 51, 52, and 53 is a collection of a plurality of narrow branch conveyors 81, and has the branch conveyor 81 corresponding to the conveying cell 1 located in each side of the conveying device 2.

Each branch conveyor 81 has an address, and the address of each branch conveyor 81 is sequentially numbered with the address of each conveying cell 1 of the conveying device 2.

More specifically, because each conveying cell 1 facing the side A of the conveying device 2 is in the first row, all the conveying cells 1 have the row address of 1, and the column addresses of the conveying cells 1 change from 1 to 6.

Thus, the addresses of the conveying cells 1 facing the side A of the conveying device 2 are 11, 21, 31, 41, 51, 61 from the top in FIG. 9.

The branch conveyor 81 connected to the conveying cell 1 having the address of 11 has the address of 01, and the branch conveyor 81 connected to the conveying cell 1 having the address of 61 has the address of 71.

Thus, the conveying cells 1 and the branch conveyor facing the side A of the conveying device 2 have the addresses of 01 to 71, and the column addresses have sequential numbers.

Similarly, because each conveying cell 1 facing the side D of the conveying device 2 is in the first column, all the column addresses have the column address of 1, and the row addresses of the conveying cells 1 change from 1 to 8.

Thus, the addresses of the conveying cells 1 facing the side D of the conveying device 2 are 11, 12, 13, 14, 15, 16, 17, 18 from the left end in FIG. 9.

The branch conveyor 81 connected to the conveying cell 1 having the address of 18 has the address of 19, and the row addresses have sequential numbers.

The object conveyed from the carrying-in conveyor 50 provided in the carrying-in side A of the conveying device 2 to the conveying device 2 is placed on one of the conveying cells 1. The object passes over the conveying cell 1, is successively delivered to the adjacent conveying cell 1, reaches any one of the carrying-out sides B, C, D of the conveying device 2, and is carried out to any one of the branch conveyors 81.

Specifically, when the traveling motor 9 is driven, the conveying roller 3 constituting the conveying surface rotates, and the object is placed on the conveying roller 3. The conveying rollers 3 of any one of the adjacent conveying cells 1 also travel. As a result, the object is discharged from the conveying cell 1 by the conveying rollers 3 of the conveying cell 1 on which the object is initially placed, and delivered to any one of the adjacent conveying cells 1.

In the present embodiment, the load presence sensor 16 is provided in each conveying cell 1, the load presence sensor 16 of the conveying cell 1 on which the object 55 was placed is turned off, and the load presence sensor 16 of the conveying cell 1 on the reception side is turned on, which allows recognition of the delivery of the object.

The delivery of the object can also be recognized by mutual communication using the transmission and reception unit 41.

In the sorting system 80 of the present embodiment, the communication is conducted between the adjacent conveying cells 1, and the conveying destination information about the object is successively taken over. That is, the conveying destination information is delivered between the control devices 30 of the conveying cells 1 in association with the movement of the object. The control device 30 sequentially rotates the conveying rollers 3 of the conveying cell 1 corresponding to a conveying path according to the conveying destination, and adjusts a rotational angle position of the turning motor 8 of the conveying cell 1 corresponding to the conveying path.

When the turning motor 8 is driven, the traveling unit 5 turns together with the turning table 6. Consequently, the conveying direction of the object 55 can be changed by driving the turning motor 8.

In the sorting system 80 of the present embodiment, in the case where the object 55 is conveyed from the carrying-in conveyor 50, the object 55 can be carried out to the branch conveyor 81 in any one of the carrying-out side B, C, D by changing the conveying direction of each conveying cell 1.

A method for controlling the sorting system 80 will specifically be described below.

The entire conveying device 2 is divided into the plurality of conveying cells 1, and each conveying cell 1 individually includes the traveling motor 9. Consequently, the conveying device 2 can individually drive and stop each conveying cell 1. In the conveying device 2 of the present embodiment, the traveling motor 9 of the conveying cell 1 at each position is always stopped, and driven only when necessary.

The term when necessary means the state in which the object is to be received from the conveying cell 1 located on the upstream side, and the state in which the object is to be discharged to the conveying cell 1 located on the downstream side.

The former is the case where the object is present in the conveying cell 1 located on the upstream side while the object is not present in the subject conveying cell 1. Specifically, the load presence sensor 16 of the conveying cell 1 located on the upstream side detects the presence of the object and the load presence sensor 16 of the subject conveying cell 1 does not detect the object, and the subject conveying cell 1 currently stops the conveyance. In this case, the subject conveying cell 1 is activated to receive the object.

In the case where the object is present in the conveying cell 1 located on the upstream side while the conveying cell 1 located on the downstream side is driven, the object can also be received from the conveying cell 1 located on the upstream side. Specifically, even in the case where the load presence sensor 16 of the conveying cell 1 located on the upstream side detects the presence of the object while the conveying cell 1 located on the downstream side is driven, the subject conveying cell 1 is activated to receive the object.

The case where the object is to be discharged to the conveying cell 1 located on the downstream side is the case where the object is present in the subject conveying cell 1 while the object is not present in the conveying cell 1 located on the downstream side. More specifically, in the case where the load presence sensor 16 of the subject conveying cell 1 detects the presence of the object while the load presence sensor 16 of the conveying cell 1 located on the downstream side does not detect the object, the subject conveying cell 1 is activated to discharge the object to the downstream side.

In the case where the object is present in the conveying cell 1 while the conveying cell 1 located on the downstream side is driven, the object can also be discharged to the conveying cell 1 located on the downstream side. Specifically, even in the case where the load presence sensor 16 of the conveying cell 1 detects the presence of the object while the conveying cell 1 located on the downstream side is driven, the subject conveying cell 1 is activated to discharge the object to the conveying cell 1 located on the downstream side.

In the conveying device 2 of the present embodiment, in the case where the object is carried in from the conveying cell 1 located on the upstream side to the subject conveying cell 1, the conveying destination information is transmitted from the conveying cell 1 located on the upstream side to the own transmission and reception unit 41 (transmission and reception unit of the subject conveying cell). The conveying destination information is stored in the conveying destination storage 40.

The conveying destination information stored in the own conveying destination storage 40 (conveying destination storage for the subject conveying cell) is erased when the object is discharged from the subject conveying cell 1.

If description is made from the movement of the object associated with the movement of information, in case where the object is carried in from a zone on the upstream side to a subject zone to move the object across the zones, the conveying destination information is also delivered from the zone on the upstream side to the zone on the downstream side.

More specifically, the conveying cell in the subject zone operates, and the own load presence sensor 16 (a load presence sensor of the subject zone) detects the object from the state in which the own load presence sensor 16 (a load presence sensor of the subject zone) does not detect the object. In this case, the conveying destination information is transmitted from the zone on the upstream side to the own transmission and reception unit 41, the information of the conveying destination storage 40 is rewritten, and the conveying destination information is stored in the own conveying destination storage 40.

That is, the information of the conveying destination storage 40 is rewritten on condition that the delivery of the object 55 to and from the adjacent conveying cell 1 is recognized, and the conveying destination information is stored in the own conveying destination storage 40.

The own load presence sensor 16 (load sensor of the subject conveying cell) detects the object 55, the subject conveying cell 1 operates, the own load presence sensor 16 (load sensor of the subject conveying cell) is changed to the state in which the own load presence sensor 16 (load sensor of the subject conveying cell) does not detect the object, and a predetermined time elapses. At this point, the conveying destination information stored in the own conveying destination storage 40 is erased.

That is, the conveying destination information stored in the conveying destination storage 40 is erased or rewritten based on whether the conveying cell 1 is driven and whether the load presence sensor 16 detects the presence of the object.

More specifically, the conveying destination information stored in the conveying destination storage 40 is rewritten when the conveying cell in the linear conveying zone is driven while the load presence sensor 16 changes from the state in which the load presence sensor 16 does not detect the presence of the object to the state in which the load presence sensor 16 detects the presence of the object.

That is, the conveying destination information stored in the conveying destination storage 40 is rewritten on condition that the delivery of the object 55 to and from the adjacent conveying cell 1 is recognized.

In the sorting system 80 of the present embodiment, an object identifying device 45 is installed in the carrying-in conveyor 50. Specifically, the object identifying device 45 is a bar code reader. Information read from the bar code reader is transmitted to the host control device 46. The host control device 46 is a known personal computer, and a CPU and a memory (not illustrated) are incorporated in the host control device 46.

The host control device 46 identifies the object 55 from the information described in the bar code, and inquires the conveying destination of the object 55. The host control device 46 inputs an address of a target place to the control device 30 of the conveying cell 1 that received the object 55. In the present embodiment, the host control device 46 functions as a conveying destination selector that specifies the conveying destination.

Referring to FIG. 10, the object 55 is conveyed by the carrying-in conveyor 50, arrives at the conveying device 2, and is introduced into the conveying cell 1 having the address of 31 of the conveying device 2.

When the object 55 reaches the conveying cell 1 having the address of 31, the load presence sensor 16 or the boundary sensor attached to the conveying cell 1 detects the presence of the object 55, the traveling motor 9 is driven to rotate the conveying roller 3, and the object 55 is drawn into the conveying cell 1 having the address of 31. When the object 55 is drawn into the conveying cell 1, the conveying roller 3 is oriented toward a direction in which the object is moved from the carrying-in side A to the carrying-out side C.

At this point, the address of the conveying destination of the object 55 is input from the host control device 46 to the conveying cell 1 (precisely, the control device 30) having the address of 31. For example, it is assumed that the conveying destination of the object 55 is the branch conveyor having the address of 05.

As described above, in the present embodiment, the host control device 46 functions as the conveying destination selector that specifies the conveying destination, and information (the branch conveyor having the address of 05) about the conveying destination of the object is input to a controller corresponding to a certain conveying cell (the conveying cell 1 having the address of 31).

The conveying cell 1 into which the object 55 is drawn compares the own address to the column address and the row address of the conveying destination address of the object 55.

In the present embodiment, the row addresses are compared to each other.

According to the example, the conveying destination of the object 55 is the row address of 5, and the conveying cell 1 on which the object 55 is currently placed has the row address of 1.

In the present embodiment, the row addresses are compared to each other, and the object 55 is linearly moved from the carrying-in side A toward the carrying-out side C until the row address of the conveying destination of the object 55 is matched with the row address of the conveying cell 1. Specifically, the object 55 is moved in the order of addresses of 31, 32, 33, 34, 35.

In the present embodiment, when the conveying cell 1 having the address of 31 receives the object 55, because the conveying roller 3 is oriented toward the direction in which the object is moved from the carrying-in side A toward the carrying-out side C, the conveying cell 1 having the address of 31 continues to rotate even after receiving the object 55. The conveying cell 1 having the address of 32 which receives the object 55 from the conveying cell 1 having the address of 31 directs the conveying roller 3 toward the direction in which the object is moved from the carrying-in side A toward the carrying-out side C, and starts to rotate the conveying roller 3.

Figure 10A:
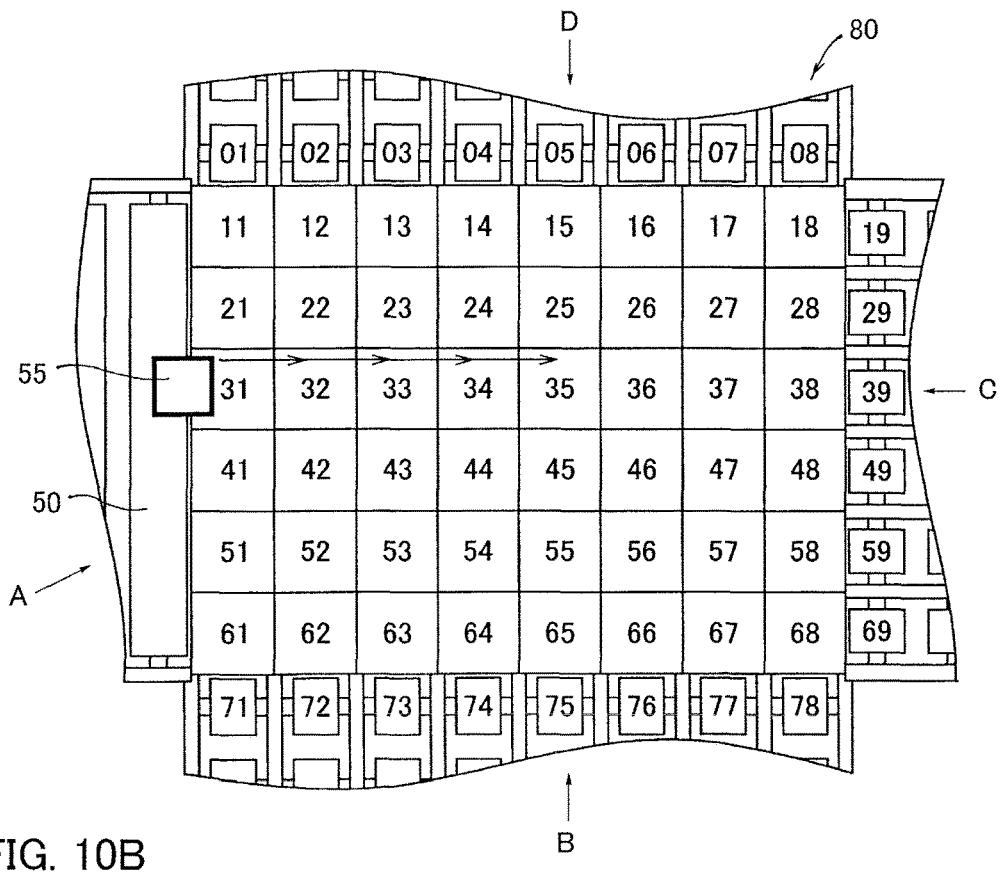
FIGS. 10A and 10B are explanatory views illustrating operation of the sorting system.

As a result, as illustrated in FIG. 10A, the object 55 is sent out from the conveying cell 1 having the address of 31 that initially receives the object 55 to the conveying cell 1 having the address of 32 adjacent to the carrying-out side C.

Along with the movement of the object 55, the conveying destination information input to the conveying destination storage 40 is sequentially sent to the conveying cell 1 having the address of 32 on the downstream side.

The conveying destination information input to the conveying destination storage 40 of the conveying cell 1 having the original address of 31 is erased.

The conveying cell 1 having the address of 32 that receives the object 55 also compares the row addresses to each other. According to the example, the conveying destination of the object 55 is the row address of 5 and the conveying cell 1 on which the object 55 is currently placed has the row address of 2, so that the conveying cell 1 having the address of 32 continues to rotate even after receiving the object 55, and sends the object 55 to the conveying cell 1 having the address of 33 adjacent to the carrying-out side C.

Along with the movement of the object. 55, the conveying destination information input to the conveying destination storage 40 is sequentially sent to the conveying cell 1 having the address of 33 on the downstream side.

The same process is repeated in the conveying cell 1 having the address of 33 that receives the object 55. That is, the conveying cell 1 having the address of 33 continues to rotate even after receiving the object 55, sends the object 55 to the conveying cell 1 having the address of 34 adjacent to the carrying-out side C, and sequentially sends the conveying destination information to the conveying cell 1 having the address of 34 on the downstream side.

The same process is repeated in the conveying cell 1 having the address of 34 that receives the object 55. That is, the conveying cell 1 having the address of 34 continues to rotate even after receiving the object 55, sends the object 55 to the conveying cell 1 having the address of 35 adjacent to the carrying-out side C, and sequentially sends the conveying destination information to the conveying cell 1 having the address of 35 on the downstream side.

The conveying cell 1 having the address of 35 that receives the object 55 also compares the row addresses to each other. According to the example, the conveying destination of the object 55 is the row address of 5, and the conveying cell 1 on which the object 55 is currently placed has the row address of 5, so that the row addresses of the both are matched with each other.

Figure 10B:
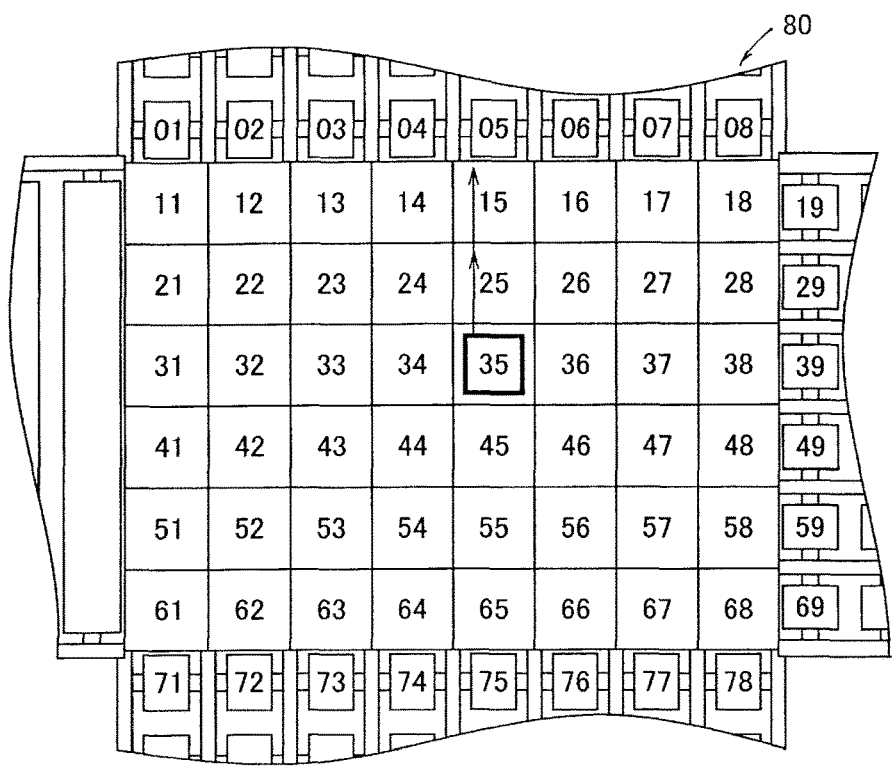

In the present embodiment, the row addresses are compared to each other, and when the row addresses are matched with each other, the turning motor 8 is driven to rotate the turning table 6, and the direction of the conveying roller 3 is changed. Specifically, the turning table 6 is turned by 90 degrees, and the object is directed toward the direction in which the object is moved toward the carrying-out sides B, D as illustrated in FIG. 10B.

Then, the own address is compared to the column addresses of the conveying destination address of the object 55.

According to the example, the conveying destination of the object 55 is the column address of 0, and the conveying cell 1 on which the object 55 is currently placed has the column address of 3.

In the present embodiment, the column addresses are compared to each other, and the conveying roller 3 is rotated in the direction in which the column addresses of the conveying destination of the object 55 and the conveying cell 1 are matched with each other.

As a result, the object 55 advances from the conveying cell 1 having the address of 35 toward the direction of the side D as illustrated in FIG. 10B.

The object 55 moves from the conveying cell 1 having the address of 35 to the conveying cell 1 having the address of 25 adjacent in the direction of the side D.

Along with the movement of the object 55, the conveying destination information input to the conveying destination storage 40 is sequentially sent to the conveying cell 1 having the address of 25 on the downstream side.

The conveying cell 1 having the address of 25 that receives the object 55 also compares the column addresses to each other. According to the example, the conveying destination of the object 55 is the row address of 0 and the conveying cell 1 on which the object 55 is currently placed has the column address of 2, so that the conveying cell 1 having the address of 25 continues to rotate even after receiving the object 55, and sends the object 55 to the conveying cell 1 having the address of 15 adjacent to the carrying-out side D.

Along with the movement of the object 55, the conveying destination information input to the conveying destination storage 40 is sequentially sent to the conveying cell 1 having the address of 15 on the downstream side.

Figure 11A:
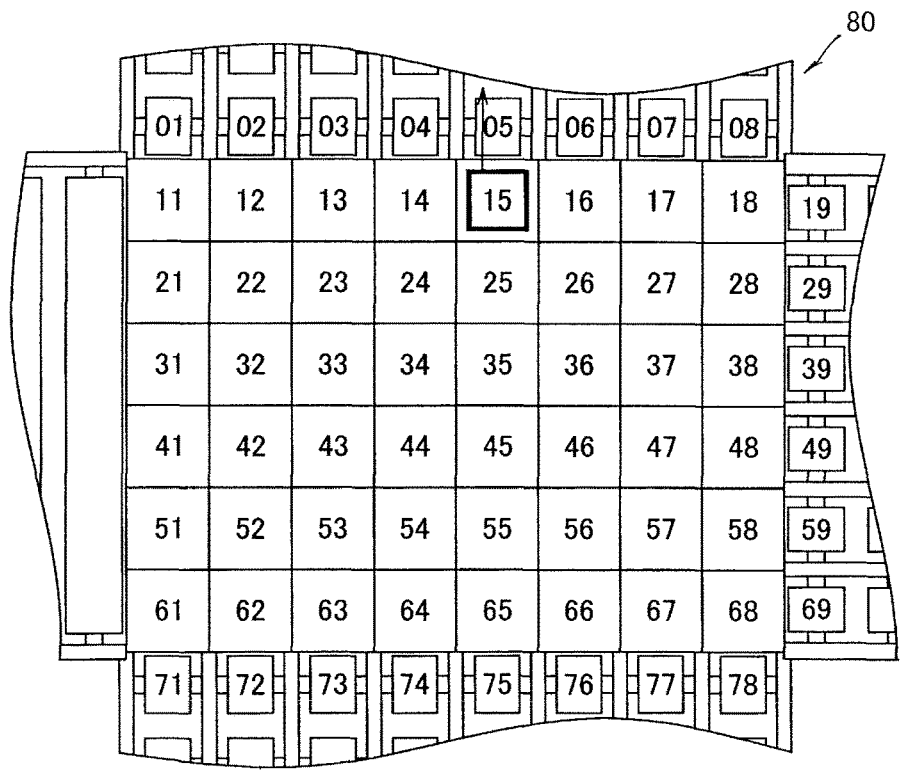
FIGS. 11A and 11B are explanatory views illustrating the operation of the sorting system continued from FIG. 10.
Figure 11B:
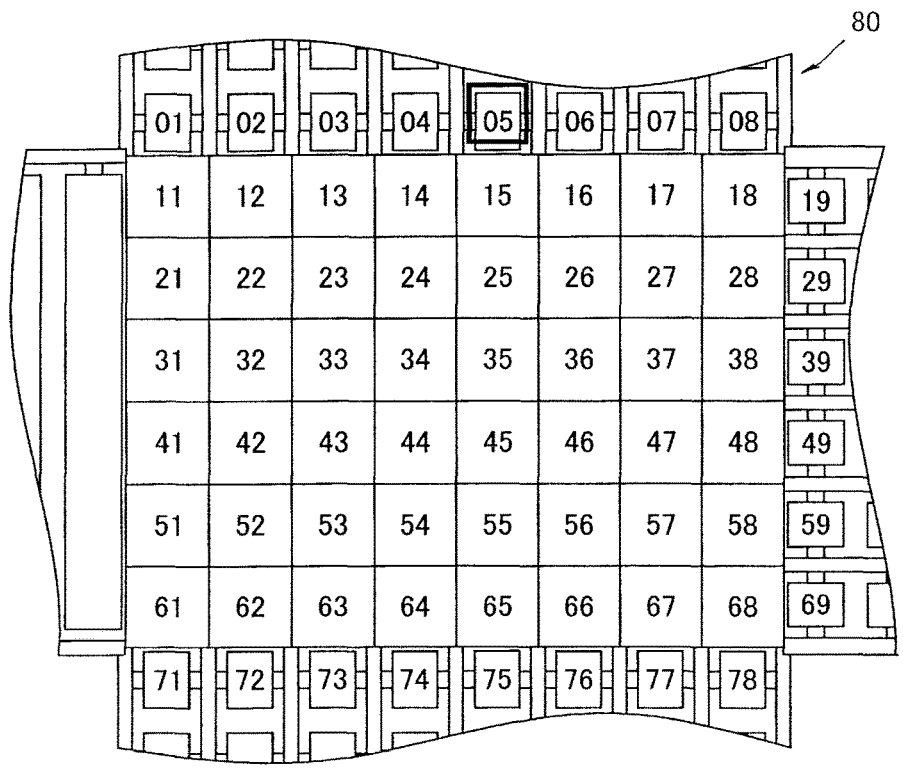

The same process is repeated in the conveying cell 1 having the address of 15 that receives the object 55. That is, the conveying cell 1 having the address of 15 continues to rotate even after receiving the object 55, sends the object 55 to the branch conveyor 81 adjacent to the carrying-out side D as illustrated in FIG. 11C. That is, the object 55 is discharged from the conveying device 2 to the branch conveyor having the address of 05 (FIG. 11D). The conveying destination information is erased when the object 55 is discharged to the outside of the conveying device 2.

In the above embodiment, the object is carried out in the direction of the side D. Alternatively, the object may be carried out in the directions of other sides.

In the above embodiment, the control device 30 is provided in all the conveying cells 1. Alternatively, the number of conveying cells in each of which the control device 30 is provided may be decreased.

Figure 12:
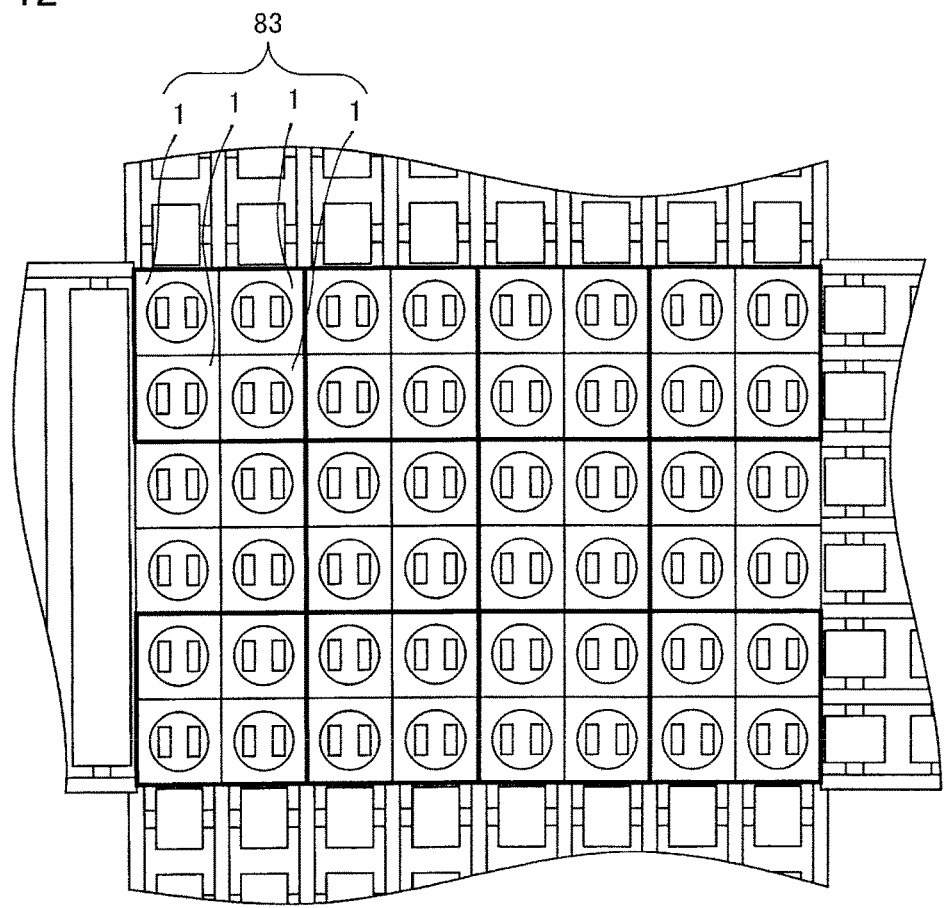
FIG. 12 is a conceptual view illustrating a conveying device according to another embodiment of the present invention.

For example, as illustrated in FIG. 12, the four conveying cells 1 may be set as one group 83, and the control device 30 may be provided in each group.

According to the present embodiment, the plurality of conveying cells 1 belonging to one group 83 are synchronously driven. That is, the turning tables 6 of the plurality of conveying cells 1 belonging to one group 83 are oriented in the same direction, and the conveying rollers 3 of the plurality of conveying cells 1 belonging to one group 83 rotate in the same direction.

The plurality of conveying cells 1 belonging to group 83 may be driven by a common motor. For example, the traveling motor 9 may be provided in one of the plurality of conveying cells 1 belonging to one group 83, and the power of the traveling motor 9 may be conducted to another conveying cell 1. Similarly, the turning motor 8 may be provided in one of the conveying cells 1, and the power of the turning motor 8 may be conducted to another conveying cell 1.

In the above embodiment, the turning table 6 of each conveying cell 1 turns by 90 degrees to change the conveying direction of the object 55 to a right angle. Alternatively, for example, the turning table 6 may be turned to an angle of 45 degrees, and the object may be moved in an oblique direction. The turning table 6 may be turned to a midway angle such that a conveying locus of the object 55 draws a circular arc.

In the above embodiment, after the own row address (row address of the subject conveying cell) is compared to the row address of the conveying destination of the object 55, the own column address (column address of the subject conveying cell) is compared to the column addresses of the conveying destination of the object 55. Alternatively, the own column address may previously be compared to the column address of the conveying destination of the object 55.

For example, in the case where the object is present in the conveying cell 1 adjacent to the conveying cell 1 on the row side with respect to the conveying cell 1 on which the object 55 is placed, the object may be conveyed to the conveying cell 1 adjacent on the column side in consideration of the situation in the advancing direction.

For example, the own address is compared to the column address and the row address of the conveying destination address of the object 55 to determine the advancing directions of the column and the row. The load presence sensor 16 of the conveying cell 1 in the advancing direction may be checked to send the object 55 onto the side on which the object 55 is not present.

Similarly, in the case where any error is generated in any one of the conveying cells 1, the object 55 may be conveyed while making a detour to avoid the conveying cell 1 in which the error is generated.

In the above embodiment, for convenience of description, the object 55 is carried in one by one from the carrying-in conveyor 50 to the conveying device 2 by way of example. Alternatively, a large number of objects 55 may simultaneously be introduced into the conveying device 2.

In this case, the conveying device 2 is congested in some cases. However, as described above, the conveying cell 1 is driven in the case where the specific condition is satisfied, so that each object 55 moves toward the destination.

In the above embodiment, the method with the load presence sensor 16 provided in the conveying cell 1 and the method by mutual communication of the transmission and reception unit 41 are adopted as means for recognizing the delivery of the object.

According to the present embodiment, the delivery of the object can be recognized by two kinds of methods. However, the present invention is not limited to this configuration, and the delivery of the object may be recognized by any one of the methods.

Each of the conveying cells 1 adopted in the above embodiment includes the traveling unit 5 including a contact member, which rotates or travels while being in contact with the object, and moves the object, the turning table 6 that supports the traveling unit 5, the turning motor 8, and the traveling motor 9. The traveling unit 5 is driven by the traveling motor 8, and the turning table is directly or indirectly engaged with the output unit of the turning motor 8 such that the turning table and the traveling unit are turned by the turning motor 8.

The turning motor 8 and the traveling motor 9 vertically overlap each other.

Figure 13:
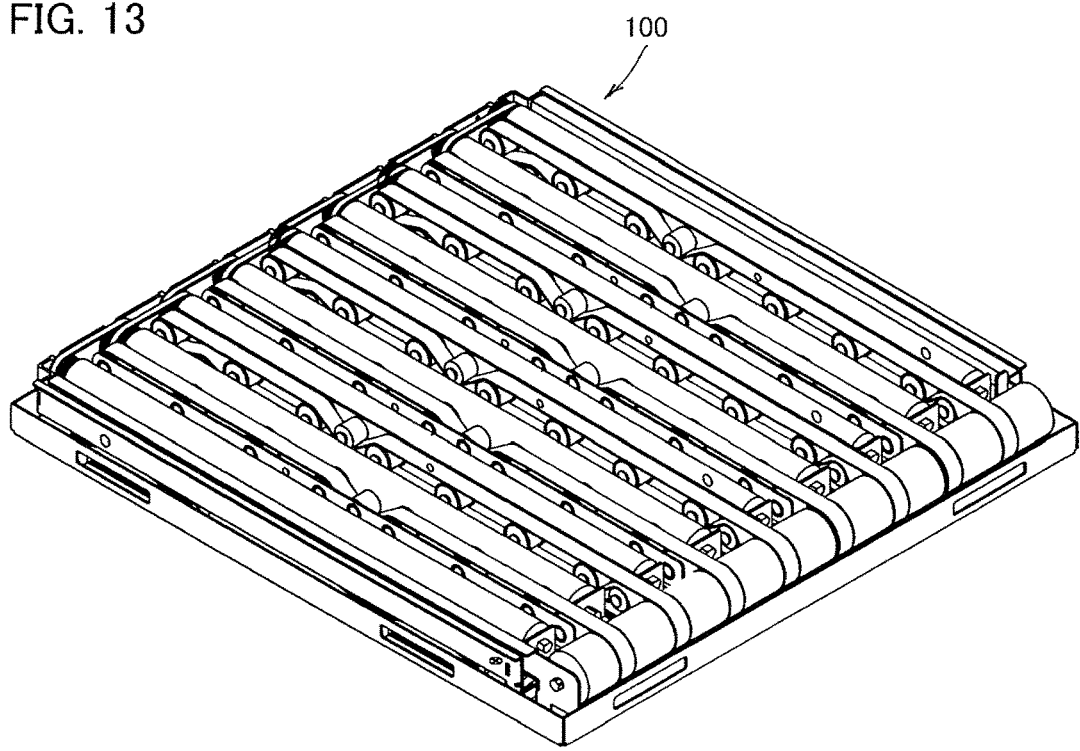
FIG. 13 is a perspective view illustrating a conveying cell adopted in another embodiment of the present invention.
Figure 14:
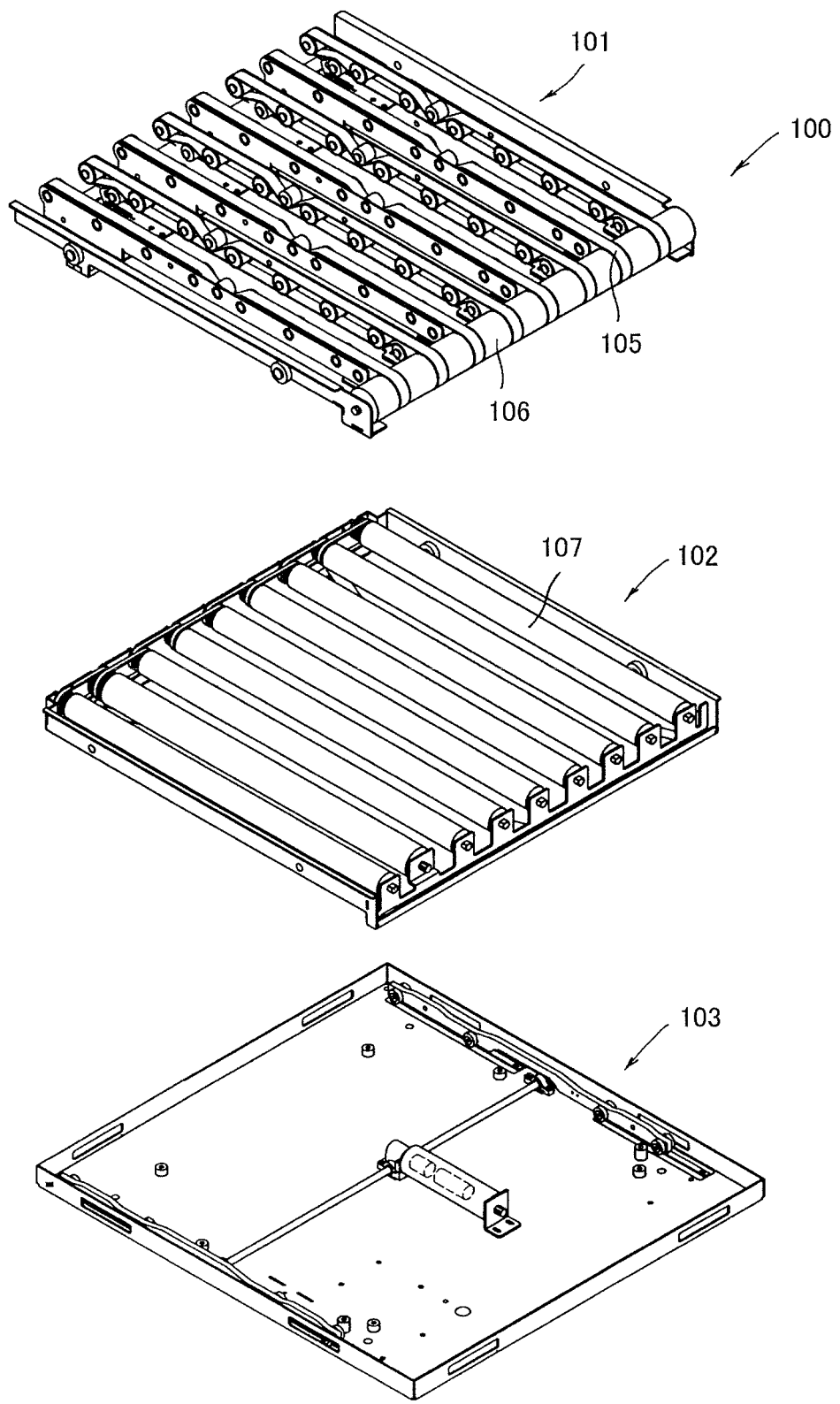
FIG. 14 is an exploded perspective view illustrating the conveying cell in FIG. 13.

The present invention is not limited to the above conveying cell 1, but may be a conveying cell 100 having a structure as disclosed in, for example, FIGS. 13 and 14.

The conveying cell 100 has a direction changing mechanism that switches the conveying direction or the carrying-in direction to a right angle direction.

As illustrated in FIG. 14, the conveying cell 100 is constructed with a main conveying conveyor 101, a sub conveying conveyor 102, and a lifting and lowering device 103.

The main conveying conveyor 101 of the conveying cell 100 is a belt conveyor in which a plurality of thin belts 105 are arranged at constant intervals. The main conveying conveyor 101 is driven by a motor-incorporating roller 106 provided at an end.

The sub conveying conveyor 102 of the conveying cell 100 is a roller conveyor. The sub conveying conveyor 102 has a plurality of rollers 107 arranged in parallel, and the plurality of rollers 107 are connected with each other by a belt 27. One of the plurality of rollers 107 constituting the sub conveying conveyor 102 is a motor-incorporating roller, and all the rollers 107 rotate by driving the motor-incorporating roller.

As illustrated in FIG. 5, the sub conveying conveyor 102 is disposed such that the roller 107 is located between the belts 105 of the main conveying conveyor 101.

The lifting and lowering device 23 includes a translation cam 29, and lifts and lowers the main conveying conveyor 101 and the sub conveying conveyor 102.

In the case where the object placed on the conveying cell 100 advances linearly, the main conveying conveyor 101 is caused to protrude above the sub conveying conveyor 102 by the lifting and lowering device 23, and the motor-incorporating roller 106 of the main conveying conveyor 101 is driven to cause the belt 105 to travel.

In the case where the object placed on the conveying cell 100 is discharged in a cross direction, after the object is drawn into the main conveying conveyor 101, the sub conveying conveyor 102 is lifted by the lifting and lowering device 23 while the main conveying conveyor 101 is lowered, the sub conveying conveyor 102 projects above the main conveying conveyor 101, and the motor-incorporating roller of the sub conveying conveyor 102 is driven to rotate each roller 107.

EXPLANATION OF REFERENCE SIGNS

1: conveying cell
2: conveying device
6: turning table (conveying direction changing unit)
16: load presence sensor
30: control device
40: conveying destination storage
41: transmission and reception unit
65: address storage
66: address comparator

The invention claimed is:

1. A conveying device comprising a plurality of conveying cells that move an object, the plurality of conveying cells being arranged planarly,
wherein some of the plurality of conveying cells include a conveying direction changing unit that changes a conveying direction,
wherein each of the plurality of conveying cells is configured to be driven by a corresponding controller,
wherein each of the plurality of conveying cells has an address,
wherein the plurality of conveying cells include a subject conveying cell, and
wherein based on an address of the subject conveying cell and a conveying destination of the object that has been carried in the subject conveying cell, the controller determines a carrying-out direction of the subject conveying cell such that the object approaches the conveying destination,
wherein the plurality of conveying cells each includes one or more load presence sensors, each of the load presence sensors detecting whether the object is present on the conveying cell.

2. The conveying device according to claim 1, wherein each of the conveying cells includes the controller.

3. The conveying device according to claim 1,
wherein the plurality of conveying cells include an adjacent conveying cell disposed adjacently to the subject conveying cell,
wherein delivery of the object between the subject conveying cell and the adjacent conveying cell can be recognized, and
wherein information representing the conveying destination of the object is delivered along with movement of the object.

4. The conveying device according to claim 1,
wherein the controller includes:
a conveying destination storage that stores destination information temporarily, the destination information representing the conveying destination of the object;
an information receiving unit that receives the destination information sent by the controller, the controller handling the conveying cell that has carried in the object; and
an information transmission unit that transmits the destination information to the controller, the controller handling the conveying cell that receives the object.

5. The conveying device according to claim 1, further comprising a conveying destination selector that specifies the conveying destination,
wherein information representing the conveying destination of the object is input to the controller handling a certain conveying cell.

6. The conveying device according to claim 1,
wherein the conveying cells are arranged in columns and rows, accordingly the address given to the conveying cell including a column address associated with a position in the column and a row address associated with a position in the row,
wherein the conveying destination includes the column address associated with a position in the column and the row address associated with a position in the row,
wherein along with movement of the object in a column direction or a row direction by the conveying cell, the column address or the row address of the conveying destination of the object is compared to the column address or the row address of the conveying cell, and
wherein the conveying cell changes the conveying direction to move the object in the row direction when the conveying cell moves the object in the column direction and matches the column addresses with each other, whereas the conveying cell changes the conveying direction to move the object in the column direction when the conveying cell moves the object in the row direction and matches the row addresses with each other.

7. The conveying device according to claim 1,
wherein the plurality of conveying cells include an adjacent conveying cell disposed adjacently to the subject conveying cell,
wherein delivery of the object between the subject conveying cell and the adjacent conveying cell can be recognized,
wherein the controller includes a conveying destination storage that temporarily stores destination information representing the conveying destination of the object, and
wherein the destination information is erased when the delivery of the object from the subject conveying cell to the adjacent conveying cell is recognized, the destination information having been stored in the conveying destination storage for the subject conveying cell.

8. The conveying device according to claim 1,
wherein the plurality of conveying cells include an adjacent conveying cell disposed adjacently to the subject conveying cell, wherein delivery of the object between the subject conveying cell and the adjacent conveying cell can be recognized, wherein the controller includes a conveying destination storage that temporarily stores destination information representing the conveying destination of the object, and wherein the destination information is rewritten to a new destination information when the delivery of the object from the adjacently conveying cell to the subject conveying cell is recognized, the new destination information going to be stored in the conveying destination storage for the subject conveying cell.

9. The conveying device according to claim 1,
wherein the conveying cell includes:
a traveling unit that moves a object, the traveling unit including a contact member that rotates or travels in contact with the object;
a turning table that supports the traveling unit;
a turning motor; and
a traveling motor,
wherein the traveling unit is driven by the traveling motor, and
wherein the turning table is directly or indirectly engaged with an output unit of the turning motor such that the turning table and the traveling unit are turned by the turning motor.

10. The conveying device according to claim 1,
wherein the conveying cell includes:
a traveling unit that moves a object, the traveling unit including a contact member that rotates or travels in contact with the object;
a turning table that supports the traveling unit;
a turning motor;
a traveling motor; and
a driving shaft,
wherein the turning motor includes a through-hole penetrating in an axial direction and an output unit that outputs turning force,
wherein the driving shaft is inserted in the through-hole,
wherein the traveling motor is provided below the turning motor,
wherein the driving shaft is rotated by the traveling motor,
wherein the traveling unit is driven by the driving shaft, and
wherein the turning table is directly or indirectly engaged with the output unit of the turning motor such that the turning table and the traveling unit are turned by the turning motor.

11. The conveying device according to claim 9, wherein the turning motor and the traveling motor are located at overlapping positions.

12. The conveying device according to claim 1,
wherein the conveying cell includes a main conveying conveyor, a sub conveying conveyor, and an lifting and lowering unit that lifts and lowers at least one of the main conveying conveyor and the sub conveying conveyor,
wherein the main conveying conveyor includes a main conveying passage through which the object is conveyed in a certain direction in a certain planar area,
wherein the sub conveying conveyor includes a sub conveying passage through which the object is conveyed in a direction intersecting with the conveying direction of the main conveying passage, the sub conveying passage being disposed in a planar area identical to that of the main conveying passage, and
wherein the conveying direction of the object is changed by lifting one of the main conveying passage and the sub conveying passage above the other using the lifting and lowering unit.

* * * * *